A. R. SCHOEN.
SIGN FASTENER OR SIGN NAIL.
APPLICATION FILED JUNE 12, 1920.

1,434,027.

Patented Oct. 31, 1922.

Arthur Rudolf Schoen, Inventor.
By Emil Neuhart
Attorney.

Patented Oct. 31, 1922.

1,434,027

UNITED STATES PATENT OFFICE.

ARTHUR RUDOLF SCHOEN, OF BUFFALO, NEW YORK.

SIGN FASTENER OR SIGN NAIL.

Application filed June 12, 1920. Serial No. 388,701.

*To all whom it may concern:*

Be it known that I, ARTHUR RUDOLF SCHOEN, a citizen of the United States of America, residing in the city of Buffalo, county of Erie, State of New York, have invented a new and useful Sign Fastener or Sign Nail; and I do hereby declare the following to be a full, clear, and exact description thereof, viz:

My invention relates to a sign-fastener; that is to say, it is an article by means of which large or small commercial advertising signs may be safely and securely attached to store fronts and buildings.

One of the objects of my invention is to effect an improvement in this class of fasteners whereby a better and more reliable fastening for a sign is afforded than with the use of the present day sign-nails or spikes.

Another object is the provision of a fastener for signs and the like, which embodies in its entirety an ordinary nail or spike and a specially designed washer or claw, by the use of which all of the advantages of the ordinary sign-nail or spike are retained while possessing several advantages thereover.

A further object is to provide a sign or analogous fastener, which is simple in construction, inexpensive, and by the use of which considerable labor is saved in fastening signs or the like in place, especially in view of the fact that when driving an ordinary sign-nail or spike into a wall or other foundation, the nail or spike oftentimes tends to turn while driving the same, with the result that the head thereof would not properly engage the sign, thus making it necessary to withdraw the nail or spike from the wall or other foundation, and reposition it preparatory to again driving it into the wall or foundation.

With these ends in view, the invention contemplates a simple and practical fastener consisting of a washer having means to fasten it to a sign, and a nail adapted to be passed through the washer.

It also consists in a washer having an angular beveled or sharpened prong and a nail of suitable size of any common form passed through the washer and to be driven into the wall so as to force said washer against the sign with its beveled or sharpened prong driven into the sign.

The invention further consists in a washer having a prong bent from one point of its marginal portion and to be embedded in the sign, and a fluted part bent from the marginal portion thereof at a diametrically opposite point to support a nail having its shank passed through the washer and retained against the edge of the sign.

In the drawings:—

Figure 1:
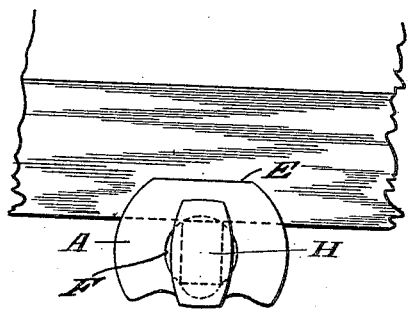
Fig. 1 is a front view of my improved fastener in position, upholding a sign.
Figures 2, 3:
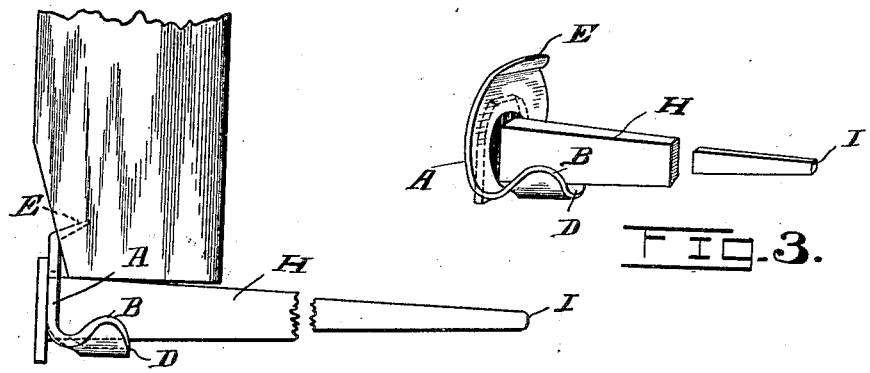
Fig. 2 is a side elevation of the same showing a portion of the end of the sign.
Fig. 3 is a perspective view of the complete fastener, with a portion of the shank of the nail broken away.
Figure 4:
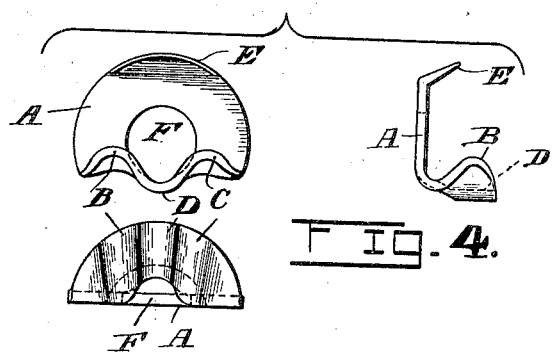
Fig. 4 is a group view of the washer showing the same as viewed from the inner side, from the bottom, and from the side, respectively, the bottom and side views being projected from the view of the inner side of the washer.

Reference being had to the drawings, the washer, designated A, is constructed of an ordinary flat washer, it being bent or shaped at diametrically opposite points and into such form that the portion thereof, which is below its center perforation, is at right angles to the body proper of the washer. This lower portion is fluted to form a central depressed portion D and opposite elevated portions B, C, the central depressed portion being longer than the elevated portions, due to the fluted lower portion being formed of a segment of the washer. The washer is also bent or shaped into such form that the portion thereof, which is above its center perforation, is at an angle of forty-five degrees to horizontal, as at E; the edge of said bent upper portion E being beveled.

The upper and lower bent portions of the washer trend in the same general direction, in order to allow the points thereof to be used together as a claw which will grip and securely hold that to which the sign-fastener is applied. The reason for bending and shaping the upper and lower portions of the washer, as above described and as shown on the drawings, hereto attached, is to enable the sign-fastener to support the nail which upholds the sign, and secure a firm hold or purchase on the sign supported by the nail; thus preventing the sign from moving in any direction.

The washer has the ordinary circular perforation or hole F in its center. Through this perforation the nail H is thrust, the nail pointing in the same direction as the right-angled portion of the washer.

The nail and washer claw, when joined together, form the complete sign-fastener and the purpose of this sign-fastener is to securely attach large store front signs, and advertising signs of every name, nature and description, to any supporting wall or stand.

The sign-fastener is used in the following manner:

The nail point is thrust through the perforated center of the washer claw; the portion E of the washer claw, which is bent at an angle of forty-five degrees to horizontal being above the nail and facing in the general direction of the nail; the portion of the washer claw, which is bent at a right angle to the flat central portion being below the nail and also facing in the direction of the nail. The nail and washer claw are placed into position underneath the sign, or similar article, which it is intended to support or place into position. The nail is driven through the center of the washer into the wall or stand to which the sign is to be attached. The lower portion of the sign-fastener supports the nail, gives strength to the washer, and keeps the fastener in position. The sizes of the nail and washer used depend upon the weight of the burden they are to bear, the same varying with the size of the sign or similar article being emplaced.

The sign-fastener herein described is not a nail with an enlarged head, nor a nail, the head of which has merely been bent or shaped in one direction. A nail with an enlarged head does not take hold of any portion of the sign or supporting wall, except in so far as its point is driven into same. The sign-fastener herein described, because of its specially shaped and movable washer claw, grasps hold of, and is driven into, both sign and supporting wall, with the result that it holds same together securely and permanently. The sign-fastener or sign-nail will hold and support in place any sign, as long as the material composing the sign remains itself in good condition.

I claim:

1. A sign-fastener comprising a nail and a washer, and means on the washer to fasten the same to a sign.

2. A sign-fastener comprising a nail and a washer, said washer having an inwardly-directed prong adapted to be embedded in the sign.

3. A sign-fastener comprising a nail and a washer, said washer having a portion of its edge bent in the direction of the length of the nail to bear against and conform to the shank of the nail.

4. A sign-fastener comprising a nail and a washer, means to fasten the washer to the sign, means on the washer to support the nail, and an aperture in the washer to receive the shank of the nail.

5. A sign-fastener comprising a nail and a washer, the nail supporting the lower edge of the sign, an aperture in the washer to receive the shank of the nail, a prong above the aperture entering the sign board, and an inwardly-directed portion below the aperture bearing against the shank of the nail and in co-operation with said prong clamping the shank of the nail against the edge of the sign.

6. A sign-fastener comprising a nail and a washer, the washer having a portion of its edge bent to enter a sign board and having the opposite portion of its edge bent in the same direction to bear against and conform to the shank of the nail.

7. A sign-fastener comprising a nail and a washer through which said nail is passed, said washer having an inwardly-directed prong at its marginal portion adapted to enter a sign and having an inwardly-directed fluted portion at a point diametrically opposite said prong to receive the shank of the nail.

8. A sign-fastener comprising a nail and a washer, said washer being bent inwardly at diametrically opposite points to grasp the sign and nail and retain the sign in place when the head of the nail is driven against said washer.

9. A sign-fastener comprising a nail and a washer, said washer being bent into claw form and having part thereof engaging the sign, part thereof engaging the nail and being itself engaged by the nail to firmly hold the sign against a wall or other foundation.

ARTHUR RUDOLF SCHOEN.